United States Patent
Ban (10) Patent No.: US 7,826,667 B2
(45) Date of Patent: Nov. 2, 2010

(54) APPARATUS FOR MONITOR, STORAGE AND BACK EDITING, RETRIEVING OF DIGITALLY STORED SURVEILLANCE IMAGES

(75) Inventor: Oliver K. Ban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 12/060,614

(22) Filed: Apr. 1, 2008

(65) Prior Publication Data

US 2008/0181462 A1   Jul. 31, 2008

Related U.S. Application Data

(63) Continuation of application No. 11/412,183, filed on Apr. 26, 2006, now abandoned.

(51) Int. Cl.
*G06K 9/68* (2006.01)

(52) U.S. Cl. .................. 382/222; 345/545; 345/619; 348/135; 348/143; 382/103; 382/195; 382/225; 382/236

(58) Field of Classification Search ............. 345/545, 345/619; 348/135, 143; 382/103, 107, 195, 382/222, 236, 239
See application file for complete search history.

(56) References Cited

U.S. PATENT DOCUMENTS

| | | | |
|---|---|---|---|
| 4,257,063 A | | 3/1981 | Loughry et al. |
| 5,219,117 A | | 6/1993 | Lin |
| 5,388,327 A | | 2/1995 | Trabucco |
| 5,654,772 A | | 8/1997 | Mester et al. |
| 5,775,569 A | | 7/1998 | Berger et al. |
| 6,493,041 B1 | * | 12/2002 | Hanko et al. ............... 348/699 |
| 6,842,540 B1 | * | 1/2005 | Okayama et al. ............. 382/246 |
| 6,985,172 B1 | * | 1/2006 | Rigney et al. ............... 348/149 |
| 7,035,434 B2 | * | 4/2006 | Estevez ...................... 382/107 |
| 7,145,950 B2 | * | 12/2006 | Hsu et al. ............... 375/240.16 |
| 7,376,244 B2 | * | 5/2008 | Baer ........................ 382/103 |
| 7,477,258 B2 | | 1/2009 | Ban |
| 7,486,800 B2 | * | 2/2009 | Asama et al. ............... 382/103 |
| 2003/0189655 A1 | * | 10/2003 | Lim et al. .................. 348/241 |
| 2004/0057519 A1 | * | 3/2004 | Yamamoto et al. ...... 375/240.16 |
| 2004/0080615 A1 | | 4/2004 | Klein et al. |
| 2004/0161157 A1 | * | 8/2004 | Sato et al. .................. 382/236 |
| 2004/0189801 A1 | | 9/2004 | Chang |
| 2004/0233983 A1 | | 11/2004 | Crawford et al. |
| 2005/0002561 A1 | | 1/2005 | Monachino et al. |
| 2005/0105765 A1 | | 5/2005 | Han et al. |
| 2006/0013495 A1 | | 1/2006 | Duan et al. |

(Continued)

OTHER PUBLICATIONS

Oliver K. Ban, U.S. Appl. No. 11/412,183, Notice of Allowance, May 29, 2009, 4 pages.

*Primary Examiner*—Gregory M Desire
(74) *Attorney, Agent, or Firm*—Gibb I.P. Law Firm, LLC (57) ABSTRACT

A system and method of recording digitally stored surveillance images comprises dividing a series of continuous digital picture image frames according to timing intervals; storing a reference image in a frame buffer of a motion analyzer; detecting a motion difference between a captured image and the reference image; attributing a motion code and time stamp on the captured image; and recording the captured image when the motion code and time stamp match a predetermined threshold.

14 Claims, 6 Drawing Sheets

U.S. PATENT DOCUMENTS

| | | |
|---|---|---|
| 2006/0092274 A1 | 5/2006 | Good |
| 2006/0284976 A1 | 12/2006 | Girgensohn et al. |
| 2007/0092148 A1 | 4/2007 | Ban et al. |
| 2007/0110156 A1* | 5/2007 | Ji et al. .................. 375/240.15 |
| 2007/0252852 A1 | 11/2007 | Ban |
| 2007/0252895 A1 | 11/2007 | Ban |
| 2007/0253630 A1 | 11/2007 | Ban |
| 2008/0095435 A1 | 4/2008 | Lipton et al. |
| 2008/0100704 A1 | 5/2008 | Venetianer et al. |
| 2008/0181509 A1 | 7/2008 | Ban |
| 2008/0181518 A1 | 7/2008 | Ban |
| 2008/0246759 A1 | 10/2008 | Summers |

* cited by examiner

FIG. 6

APPARATUS FOR MONITOR, STORAGE AND BACK EDITING, RETRIEVING OF DIGITALLY STORED SURVEILLANCE IMAGES

CROSS REFERENCE TO RELATED APPLICATIONS

This application is a Continuation of U.S. application Ser. No. 11/412,183 filed Apr. 26, 2006, the complete disclosure of which, in its entirety, is herein incorporated by reference.

This application generally relates to co-pending U.S. patent applications entitled (1) "Method and Apparatus for Fast and Flexible Digital Image Compression Using Programmable Sprite Buffer" Ser. No. 11/412,205 and (2) "Method and Apparatus for a Fast Graphic Rendering Realization Methodology Using Programmable Sprite Control" Ser. No. 11/415,202 filed concurrently herewith, the contents of which in their entireties are herein incorporated by reference.

BACKGROUND

1. Technical Field

The embodiments herein generally relate to digital video imaging systems, and, more particularly, to motion analysis control for digital video surveillance imaging systems.

2. Description of the Related Art

Figure 1:
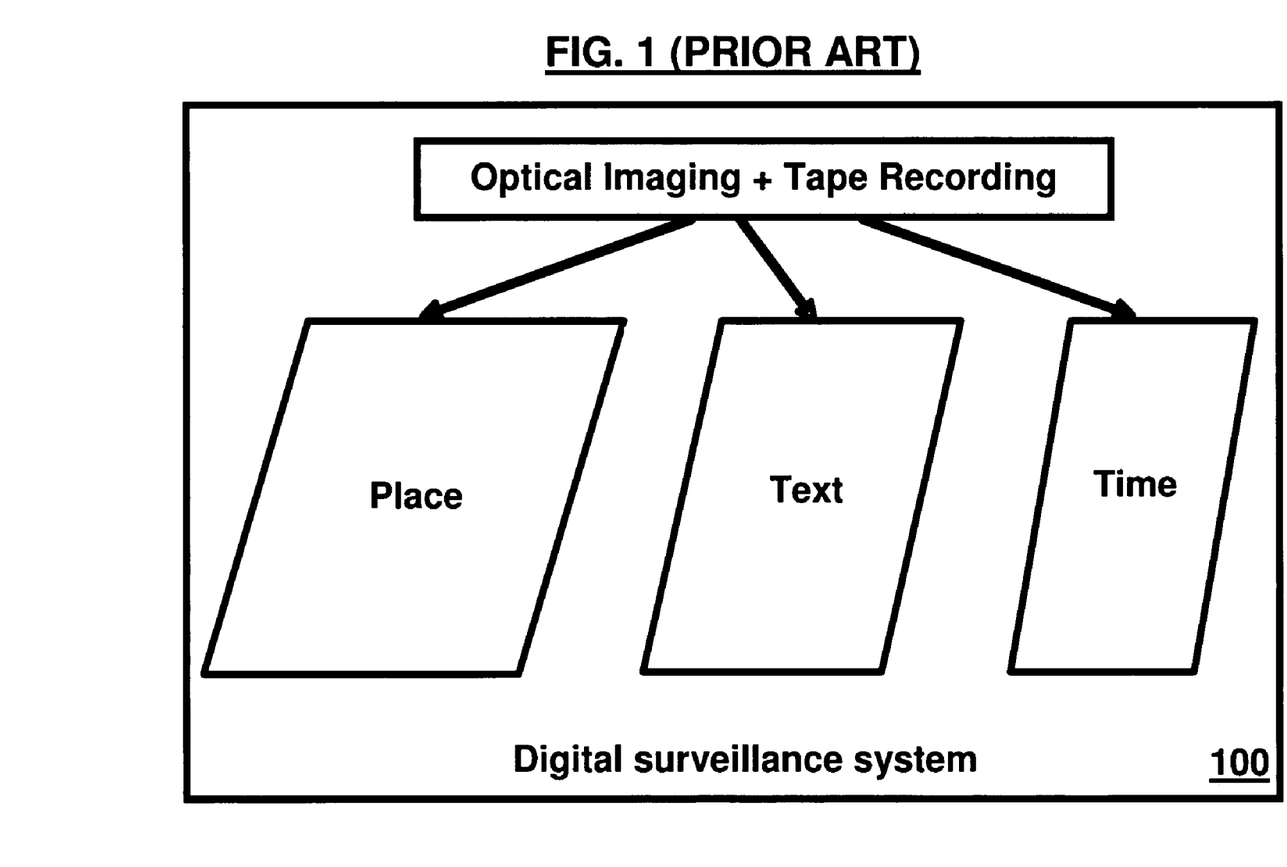
FIG. 1 illustrates a schematic diagram of a conventional digital surveillance system architecture.

Conventional video surveillance systems 100 are generally passive recording-based systems, typically either analog or digital based, as shown in FIG. 1. Generally, the recordings are time-based, and some are time-based mixed with place and other text information. These time-based systems 100 typically use a time stamp as a reference point with scanning and panning function control and associated text information recorded on a recordable tape mechanism either with an analog format or a digital format. Generally, the conventional video surveillance system 100 is an open-ended architecture, thus the contents of the recording typically have to be viewed or analyzed by a human in a very time consuming manner, which tends to create a limitation on the image analysis and retrieving process. Accordingly, there remains a need for a new technique for analyzing digitally-stored surveillance images.

SUMMARY

In view of the foregoing, the embodiments herein provide a method of recording digitally stored surveillance images, and a program storage device readable by computer, tangibly embodying a program of instructions executable by the computer to perform the method, wherein the method comprises dividing a series of continuous digital picture image frames according to timing intervals; storing a reference image in a frame buffer of a motion analyzer; detecting a motion difference between a captured image and the reference image; attributing a motion code and time stamp on the captured image; and recording the captured image when the motion code and time stamp match a predetermined threshold.

The method may further comprise coding a position of pixels located in a foreground of a digital picture image frame; sending the coded positions of the pixels located in the foreground of the digital picture image frame to the frame buffer of the motion analyzer; separating a background pixel group from a foreground pixel group in the digital picture image frames based on the coded positions; and compressing the pixels in the foreground pixel group. Moreover, the method may further comprise configuring the motion analyzer with dimension register arrays adapted to code a position of the pixels located in the foreground of the digital picture image frame. Additionally, the method may further comprise configuring the motion analyzer with a comparator array comprising exclusive OR computer-graphic logic adapted to separate the background pixel group from the foreground pixel group. Furthermore, the method may further comprise configuring the motion analyzer as a mini Cathode Ray Tube Controller (CRTC). Preferably, the configuration of the motion analyzer is variable. Also, the captured image is preferably recorded only when a motion or a difference between the captured image and the reference image is detected.

Another embodiment provides a system for recording digitally stored surveillance images, wherein the system comprises a series of continuous digital picture image frames dividable according to timing intervals; a motion analyzer adapted to store a reference image; a motion detector operatively connected to the motion analyzer, wherein the motion detector is adapted to detect a motion difference between a captured image and the reference image; an image differentiator operatively connected to the motion analyzer, wherein the image differentiator is adapted to attribute a motion code and time stamp on the captured image; and a recorder operatively connected to the motion analyzer, wherein the recorder is adapted to record the captured image when the motion code and time stamp match a predetermined threshold.

Preferably, the motion analyzer further comprises a dimension register array adapted to code a position of pixels located in a foreground of a digital picture image frame; a frame buffer adapted to store the coded positions of the pixels located in the foreground of the digital picture image frame; a comparator adapted to separate a background pixel group from a foreground pixel group in the digital picture image frames based on the coded positions; and an image compressor adapted to compress the pixels in the foreground pixel group. Preferably, the motion analyzer comprises a comparator array comprising exclusive OR computer-graphic logic adapted to separate the background pixel group from the foreground pixel group. Furthermore, the motion analyzer may comprise a mini CRTC. Moreover, the configuration of the motion analyzer is preferably variable. Additionally, the captured image is preferably recorded only when a motion or a difference between the captured image and the reference image is detected.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique for analyzing digitally-stored surveillance images. The embodiments herein achieve this by providing a technique for making the digital recording surveillance system object based instead of time based. Referring now to the drawings, and more particularly to FIGS. 2 through 6, where similar reference characters denote corresponding features consistently throughout the figures, there are shown preferred embodiments.

Figure 2:
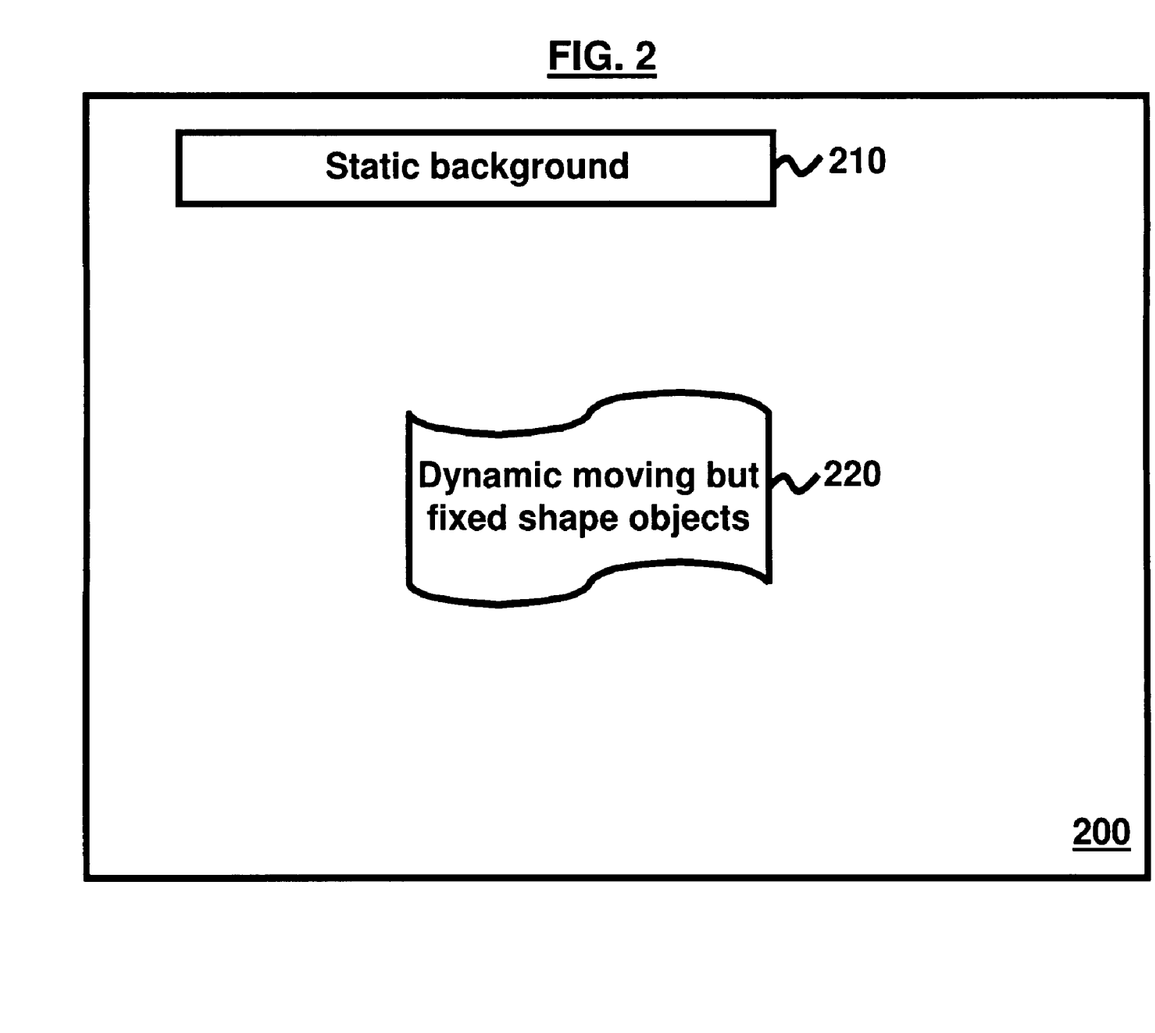
FIG. 2 illustrates a graphical representation of a motion picture frame.

As illustrated in FIG. 2, most picture frames 200 have the following characteristics: (1) most of the pictures 200 have a large portion of the "background" 210 that is relatively static, such as a flower bed or parking lot; (2) there are usually relatively small but relatively fixed shaped "foreground" objects 220 that move inside the picture frames 200; and (3) since it is a time based system, the motion search and analysis of conventional techniques is generally performed by linearly searching through human eyes.

Figure 3:
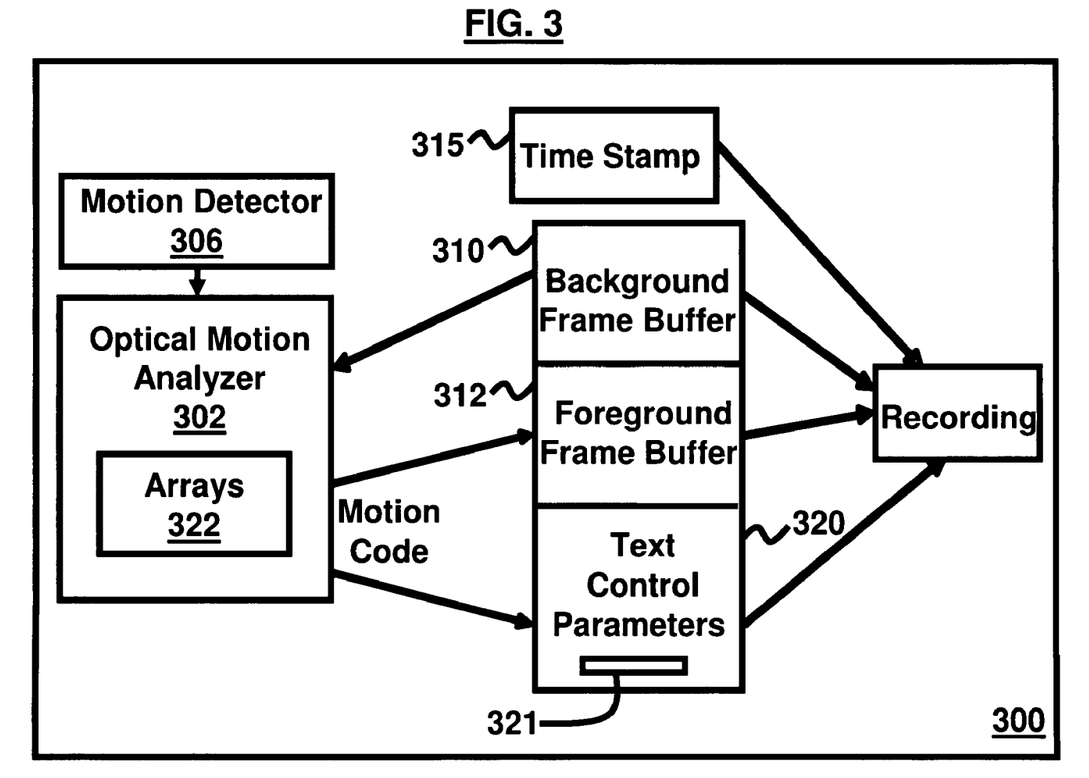
FIG. 3 illustrates a schematic diagram of a motion detection based compression architecture according to an embodiment herein.

The embodiments herein operate according to FIG. 3 in the following manner. First, as images are processed, the time domain, such as the date, time, and location of the image, is separated into timing intervals such as per minutes (for example, per 10 minutes, etc.), recording the first image as a reference image (I-Picture). Then, all of the other images (F-pictures) are compared with this I-picture. Essentially, only the I-picture is fully transmitted, the rest of the pictures, F-pictures (forward pictures) and B-pictures (backward pictures), are only transmitted for their difference with the I-pictures, whereby the difference is much smaller than the entire picture, especially when the difference is based on 8×8=64 pixel blocks. Preferably, this is facilitated by hardware (basically combiner/integrator 401 built from adder logic), which functions as a motion estimator. Generally, this technique combines the difference vectors of the two blocks of pixels on the luminance and chrominance and sends out the difference vectors, whereby the difference vectors are transmitted instead of the original pixel information.

The recording is not performed until a motion or a difference is detected and analyzed. Second, the reference frame (I-frame) is stored in a separate background frame buffer 310 as a comparing reference frame. Preferably, the frame buffer 310 is embodied as a block of computerized random access memory (RAM) based memory (for example, a linear or block shape 4 MB RAM) that stores the entire frame 200 of one picture. The time interval can be dynamically adjusted according to the particular situation (using, for example, adaptive algorithms).

Figure 4:
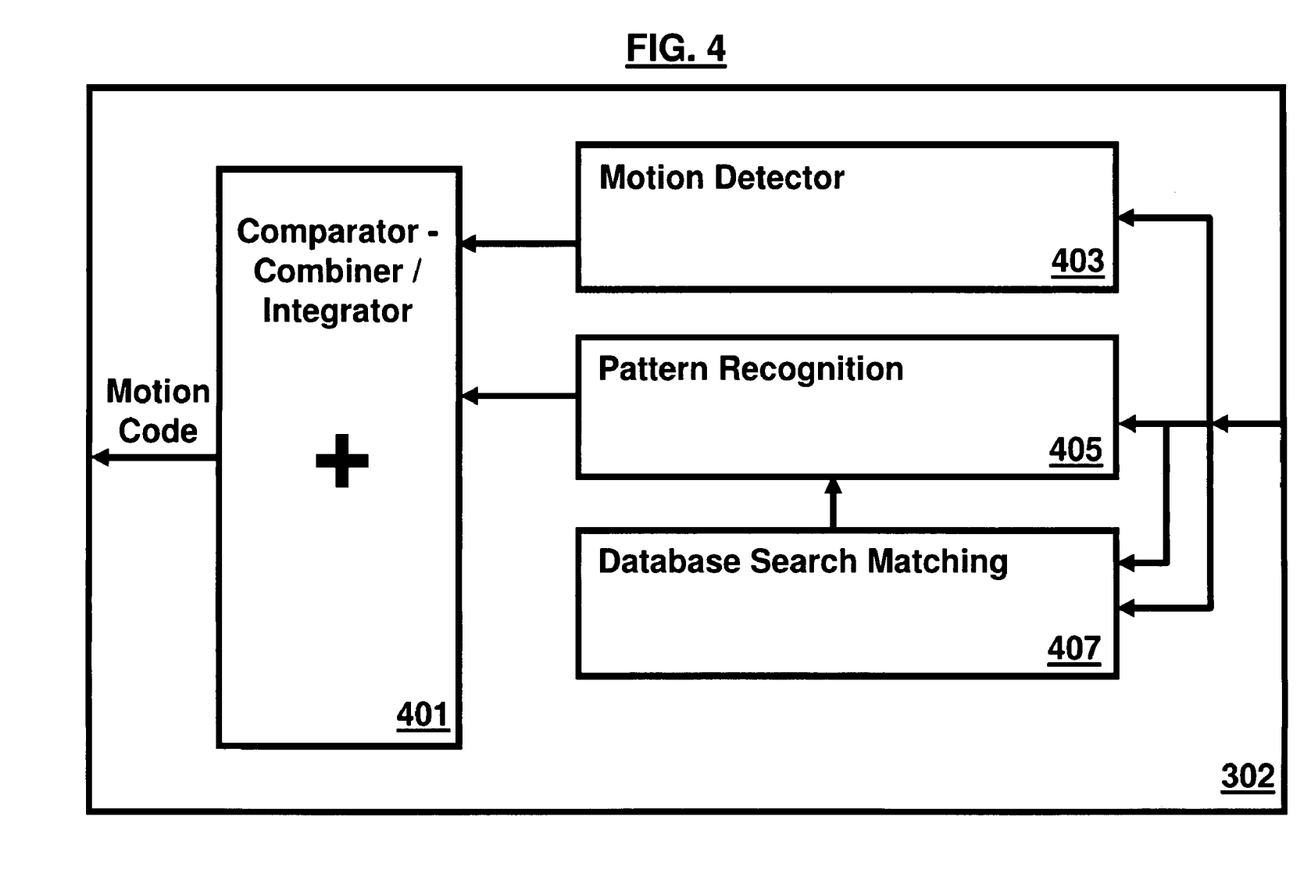
FIG. 4 illustrates a schematic diagram of a motion analysis controller architecture according to an embodiment herein.

Third, every captured frame is compared with the I-picture buffered image; whereby the difference is fed into a motion analyzer 302 that is operatively connected to the background frame buffer 310. In this context, the "difference" refers to the difference of luminance and chrominance, in the size of a 8×8=64 pixel block. More specifically, two vectors, luminance difference and chrominance difference, are fed into the motion analyzer 302. These vectors are fed by direct input into a hardware comparator (combiner/integrator) 401 of the motion analyzer 302 as shown in FIG. 4. Then, a specified set of motion codes is marked on each of the frames along with time stamps 315. The motion codes come from the output of the motion analyzer 302; more specifically, the output of the comparator 401. The image then is marked with only the difference vector instead of its pixels. An example of the motion code is (value=3 [position −1, +2]; value=−15), (luma diffs with position code, chrom diffs). The motion codes may be coded in a standard way or in anyway that a system designer desires.

Fourth, the motion analyzer 302 then analyzes the input (i.e., captured images) from the motion detector 306 and an image differentiator 321. The output of the image differentiator 321 is the difference between the stored reference images and the new input image to make a decision if the image has to be recorded. Element 320 (logic) operates on top of the foreground frame buffer 312 (memory). Thus, every frame 200 is marked with a certain motion code associated with it. The compression of pixels occurs because only selected frames have to be recorded, wherein the remainder of the frames, which is the majority of the time—anywhere from 50% to 99%—can simply be discarded.

Preferably, the motion analyzer 302 comprises a small to medium sized frame buffer 312 to store the foreground object images 220 and motion codes. The block of image pixels that are being processing is preferably a 8×8=64 pixel block. Additionally, the motion analyzer 302 preferably comprises dimension register arrays 322 adapted to code the position of the foreground buffer 312. The dimension register array 322 is preferably configured as a set of memory cells specifically formatted to record the motion code. Moreover, the motion analyzer 302 preferably comprises a comparator array (exclusive OR) 401 to distinguish the moving object area 220 from the background 210. The comparator array 401 preferably comprises exclusive OR logic to differentiate the two or more inputs to generate a same or not judgment assessment. Furthermore, the motion analyzer 302 preferably combines the input of the output of a sprite buffer 300 with the motion detector 306 in the fashion of an AND function. This occurs by combining those two sets of parameters to form a set of formatted code.

The motion analyzer 302 may be designed as a mini CRTC, with a small frame buffer 312. The CRTC is adapted to control the scan of pixels across the display on a CRT, including the horizontal and vertical position of the pixel and the value of the pixel. The shape of the motion analyzer 302 can be of any shape, such as rectangular, or could be circle or any other shape, even variable one, as long as the shape position parameters 320 can be easily coded. In this context, the "shape" of the motion analyzer 302 is the size of the motion analyzer 302. Preferably, the motion analyzer 302 is a hardware component.

The sprite buffer 300 provides the means of the motion analysis that separates the picture frames 200 with only time stamp marks 315 and at the same time, associates the frames 200 with a motion code, thus drastically increasing the editing and analysis speed by searching for a motion code in combination with a time stamp 315. This increases the speed so one does not have to search linearly as in conventional techniques by time stamp only. Accordingly, the embodiments herein facilitate searching or editing by motions, locations, and other particular features that a user can define. A digitally recoded image is much faster for searching and consumes much less space than analog data, and also provides much better image quality as well as durability. The digital image then can be copied without degradation to the quality unlimited times, which is more durable then analog images, which can generally only be copied once or twice with reasonable degradation; and with fast searching the editing efficiency is increased at least by ten times to one hundred times. Moreover, the image quality is improved by two times to four times as a digital zoom can be applied to the images 200.

Components 401, 403, 405, and 407 are roughly the building blocks of the CRTC. The pixels of the picture 200 are fed into the motion detector 403 to get the size and location of the moving part; thus the "sprite area" (i.e., small portion of pixels cut from the main picture) is identified. The picture is also fed into the pattern recognition mechanism 405 to get the location and size information of the characteristics of the moving part of the picture (for example, a moving car or person) so that an intelligent motion code can be transmitted. The picture is also fed into a database search matching mechanism 407 to get background information to see if a previously-stored pattern matches the sprite information so that an even more intelligent motion code can be programmed into the difference vectors that the combiner/integrator 401 will integrate. Finally, the combiner/integrator 401 combines this information from the output of elements 403, 405, and 407 to get a difference vector code to form a transmitted code.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. Preferably, the embodiments are implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
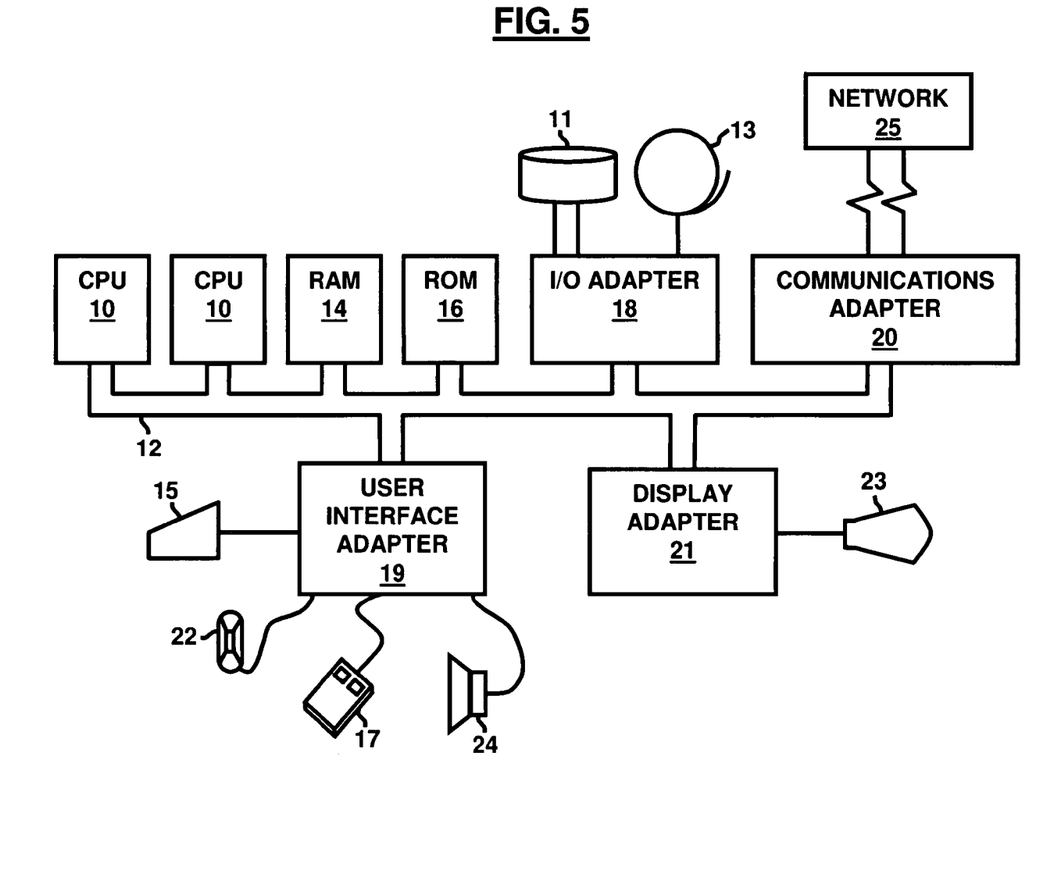
FIG. 5 illustrates a computer system diagram according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, ROM 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 6:
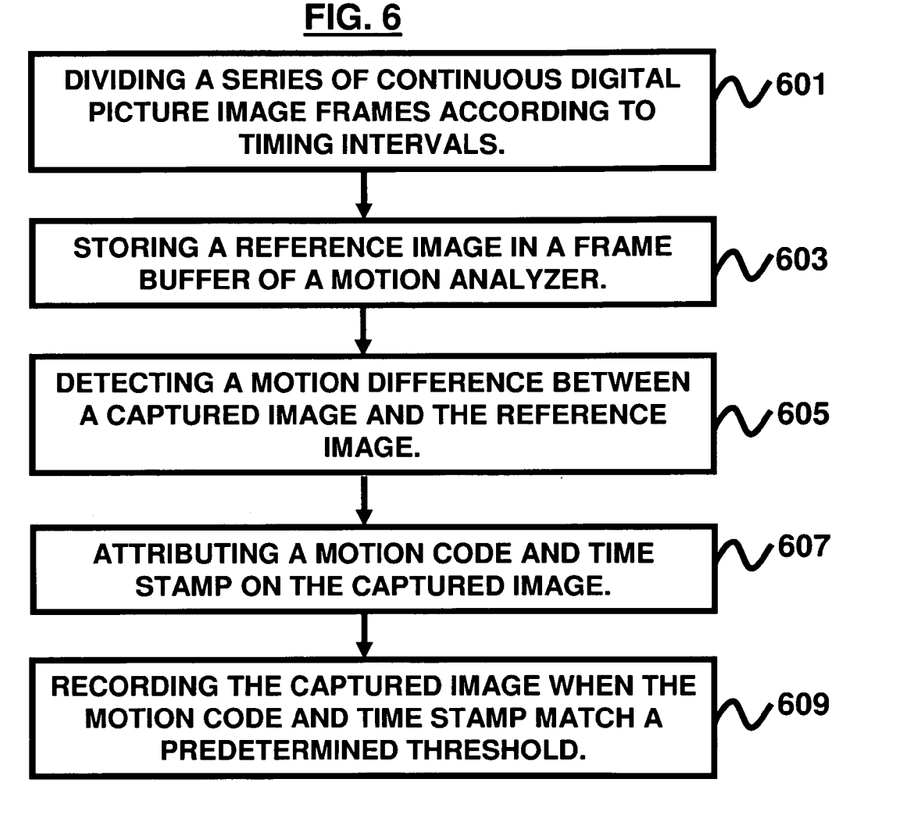
FIG. 6 is a flow diagram illustrating a preferred method of an embodiment herein.

FIG. 6 is a flow diagram illustrating a method of recording digitally stored surveillance images according to an embodiment herein, wherein the method comprises dividing (601) a series of continuous digital picture image frames according to timing intervals; storing (603) a reference image in a frame buffer 312 of a motion analyzer 302; detecting (605) a motion difference between a captured image and the reference image; attributing (607) a motion code and time stamp 315 on the captured image; and recording (609) the captured image when the motion code and time stamp 315 match a predetermined threshold. The method may further comprise coding a position of pixels located in a foreground 220 of a digital picture image frame 200; sending the coded positions of the pixels located in the foreground 220 of the digital picture image frame 200 to the frame buffer 312 of the motion analyzer 302; separating a background pixel group 210 from a foreground pixel group 220 in the digital picture image frames 200 based on the coded positions; and compressing the pixels in the foreground pixel group 220.

Moreover, the method may further comprise configuring the motion analyzer 302 with dimension register arrays 322 adapted to code a position of the pixels located in the foreground 220 of the digital picture image frame 200. Additionally, the method may further comprise configuring the motion analyzer 302 with a comparator array 401 comprising exclusive OR computer-graphic logic adapted to separate the background pixel group 210 from the foreground pixel group 220. Furthermore, the method may further comprise configuring the motion analyzer 302 as a mini CRTC. Preferably, the configuration of the motion analyzer 302 is variable. Also, the captured image is preferably recorded only when a motion or a difference between the captured image and the reference image is detected.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claim.

What is claimed is:

1. A computer-implemented method of recording digitally stored surveillance images, said method comprising:
    dividing, by a computer, a series of continuous digital picture image frames according to timing intervals, said series comprising a reference frame and a plurality of captured frames;
    storing, by said computer, every pixel of said reference image in a frame buffer;
    detecting, by said computer, a motion difference between a captured image and said reference image by determining a difference between blocks of pixels from said captured image and said reference image;
    attributing, by said computer, a motion code, based on said difference, and a time stamp to said captured image, instead of pixel information; and
    only recording, by said computer, said motion code of said captured image when said motion code matches a predetermined threshold.

2. The method of claim 1, further comprising:
    coding a position of pixels located in a foreground of a digital picture image frame;
    sending the coded positions of said pixels located in said foreground of said digital picture image frame to said frame buffer of said motion analyzer;
    separating a background pixel group from a foreground pixel group in said digital picture image frames based on the coded positions; and
    compressing said pixels in said foreground pixel group.

3. The method of claim 2, further comprising configuring said motion analyzer with dimension register arrays adapted to code the position of said pixels located in said foreground of said digital picture image frame.

4. The method of claim 2, further comprising configuring said motion analyzer with a comparator array comprising exclusive OR computer-graphic logic adapted to separate said background pixel group from said foreground pixel group.

5. The method of claim 1, wherein said detecting a motion difference is adapted to control a scan of pixels across a CRT (Cathode Ray Tube) by a Cathode Ray Tube Controller (CRTC).

6. A computer program storage device readable by computer, tangibly embodying a program of instructions executable by said computer to perform a method of recording digitally stored surveillance images, said method comprising:
    dividing a series of continuous digital picture image frames according to timing intervals, said series comprising a reference frame and a plurality of captured frames;
    storing every pixel of said reference image in a frame buffer;
    detecting a motion difference between a captured image and said reference image by determining a difference between blocks of pixels from said captured image and said reference image;
    attributing a motion code, based on said difference, and a time stamp to said captured image, instead of pixel information; and
    only recording said motion code of said captured image when said motion code matches a predetermined threshold.

7. The computer program storage device of claim 6, wherein said method further comprises:
    coding a position of pixels located in a foreground of a digital picture image frame;
    sending the coded positions of said pixels located in said foreground of said digital picture image frame to said frame buffer of said motion analyzer;
    separating a background pixel group from a foreground pixel group in said digital picture image frames based on the coded positions; and
    compressing said pixels in said foreground pixel group.

8. The computer program storage device of claim 7, wherein said method further comprises configuring said motion analyzer with dimension register arrays adapted to code the position of said pixels located in said foreground of said digital picture image frame.

9. The computer program storage device of claim 7, wherein said method further comprises configuring said motion analyzer with a comparator array comprising exclusive OR computer-graphic logic adapted to separate said background pixel group from said foreground pixel group.

10. The computer program storage device of claim 6, wherein said detecting a motion difference is adapted to control a scan of pixels across a CRT (Cathode Ray Tube) by a Cathode Ray Tube Controller (CRTC).

11. A computer system for recording digitally stored surveillance images, said system comprising:
   a memory that stores digitally recorded surveillance images; and
   a processor configured to:
      divide a series of continuous digital picture image frames according to timing intervals, said series comprising a reference frame and a plurality of captured frames;
      store every pixel of said reference image;
      detect a motion difference between a captured image and said reference image by determining a difference between blocks of pixels from said captured image and said reference image;
      attribute a motion code, based on said difference, and a time stamp to said captured image, instead of pixel information; and
      only record said motion code of said captured image when said motion code matches a predetermined threshold.

12. The computer system of claim 11, wherein said motion analyzer further comprises:
   a dimension register array adapted to code a position of pixels located in a foreground of a digital picture image frame;
   a frame buffer adapted to store the coded positions of said pixels located in said foreground of said digital picture image frame;
   a comparator adapted to separate a background pixel group from a foreground pixel group in said digital picture image frames based on the coded positions; and
   an image compressor adapted to compress said pixels in said foreground pixel group.

13. The computer system of claim 12, wherein said motion analyzer comprises a comparator array comprising exclusive OR computer-graphic logic adapted to separate said background pixel group from said foreground pixel group.

14. The computer system of claim 11, wherein said processor configured to detect said motion difference is adapted to control a scan of pixels across a CRT (Cathode Ray Tube) by a Cathode Ray Tube Controller (CRTC).

* * * * *